United States Patent
Kim et al.

(10) Patent No.: US 7,778,496 B2
(45) Date of Patent: Aug. 17, 2010

(54) METHOD FOR PROCESSING DUMP DATA PACKETS IN LOW EARTH ORBITAL SATELLITE

(75) Inventors: Myung-Ja Kim, Daejon (KR); Won-Chan Jung, Daejon (KR); Jae-Hoon Kim, Daejon (KR)

(73) Assignee: Electronics and Telecommunications Research Institute (KR)

(*) Notice: Subject to any disclaimer, the term of this patent is extended or adjusted under 35 U.S.C. 154(b) by 966 days.

(21) Appl. No.: 11/523,493

(22) Filed: Sep. 18, 2006

(65) Prior Publication Data

US 2007/0101201 A1    May 3, 2007

(30) Foreign Application Priority Data

Oct. 28, 2005  (KR) .................. 10-2005-0102508

(51) Int. Cl.
*G06K 9/00* (2006.01)
(52) U.S. Cl. .................................. 382/325
(58) Field of Classification Search .......... 382/325
See application file for complete search history.

(56) References Cited

U.S. PATENT DOCUMENTS

| | | | | |
|---|---|---|---|---|
| 4,387,391 A | * | 6/1983 | Hecker | 348/144 |
| 4,688,092 A | * | 8/1987 | Kamel et al. | 348/147 |
| 2004/0100956 A1 | * | 5/2004 | Watanabe | 370/389 |

FOREIGN PATENT DOCUMENTS

| | | |
|---|---|---|
| JP | 2001-274762 | 10/2001 |
| KR | 1996-0025276 | 7/1996 |
| KR | 1999-0042177 | 6/1999 |
| KR | 1999-0075658 | 10/1999 |
| KR | 1020010063883 A | 7/2001 |
| KR | 10-2004-0046686 A | 6/2004 |
| KR | 10-20050049277 A | 5/2005 |

OTHER PUBLICATIONS

The Design of MSC(Multi-Spectral Camera) System Operation, Sang-Soon Yong et al., pp. 3311-3313, 2004 IEEE.
Proceedings of the International Conference on Control, Automation and System, Real-Time Software Design using VxWorks for MSC(Multi-Spectral Camera) on KOMPSAT-2, Haeng-Pal Heo et al., Oct. 17-21, 2001, Cheju National Univ. Jeju, Korea, pp. 663-666.

* cited by examiner

*Primary Examiner*—Robert Beauosoliel
*Assistant Examiner*—Amine Riad
(74) *Attorney, Agent, or Firm*—Blakely, Sokoloff, Taylor & Zafman

(57) ABSTRACT

Provided is a method for processing dump data packets in a low earth orbital (LEO) satellite. The method includes the steps of: a) extracting table identification (ID) information from a header of high-resolution camera (HRC) dump data transmitted from the LEO satellite; b) searching a HRC dump table from a HRC dump table list based on the extracted table ID information; c) extracting sequence information from the transmitted HRC dump data; d) completing and storing an complete table based on the sequence information searched in the HRC dump table and the extracted sequence information; and e) reading and displaying the HRC dump table upon request of an operator.

3 Claims, 3 Drawing Sheets

METHOD FOR PROCESSING DUMP DATA PACKETS IN LOW EARTH ORBITAL SATELLITE

FIELD OF THE INVENTION

The present invention relates to a method for processing dump data packets in a low earth orbital (LEO) satellite; and, more particularly, to a dump data packet processing method that can fast and exactly process high-resolution camera (HRC) dump data based on a table identification (ID) field for classifying a HRC dump table and a counter field indicating an order of packets in the LEO satellite.

DESCRIPTION OF RELATED ART

In general, a low earth orbital (LEO) satellite circles round the earth in an orbit at an altitude of hundreds to thousands km and it includes an observation satellite such as an earth exploration satellite and a meteorological satellite, and a mobile communication satellite.

FIG. 1 shows a general LEO satellite ground control system.

The general LEO satellite ground control system includes a LEO satellite 101, a telemetry, tracking and command (TTC) subsystem 104, and an image receiving and processing system (IRPE) 106.

The LEO satellite 101 reads dump data of a high-resolution camera (HRC) from a memory according to a telecommand transmitted from the TTC subsystem 104. The dump data are included in a data region allocated to a telemetry packet and transmitted to the TTC subsystem 104. Actual image data are transmitted to the IRPE 106.

The TTC subsystem 104 transmits the telecommand to the LEO satellite 101 under the control of an operator. As a result, the TTC subsystem 104 receives a telemetry packet including the HRC dump data from the LEO satellite 101 and transmits it to a telemetry processing system 200.

Referring to FIG. 2, the telemetry processing system 200 includes a TM receiving unit 201, a TM storing unit 202, a TM displaying unit 203, and a TM DB managing unit 204.

The TM receiving unit 201 processes the telemetry packets transmitted from the LEO satellite 101 based on the type of a telemetry packet and stores all telemetry packets in the TM storing unit 202.

The TM DB managing unit 204 stores and manages data required for extracting the HRC dump data.

The TM displaying unit 203 reads data required for extracting the HRC dump data in the TM DB managing unit 204 upon the request of the operator, extracts the HRC dump data, composes and displays the dump data in the form of a HRC dump table which the operator can see. Herein, the HRC dump data are transmitted after divided into a plurality of telemetry frames based on the size. The TM displaying unit 203 extracts the HRC dump data from each telemetry frame, composes the HRC dump data as one completed table and displays the table in a terminal of the operator.

Referring to FIG. 3, structures of a conventional HRC dump data packet and a HRC dump table will be described in detail.

A HRC dump data 300 is inserted into a 64-byte region allocated to the telemetry frame and includes a packet identification (ID) field 301, a start address field 302 and a data field 303.

The packet ID field 301 indicates the type of a telemetry packet and shows whether a telemetry frame is a normal packet having the HRC telemetry data or the HRC dump data packet having the HRC dump data.

The start address field 302 indicates a start address of the HRC dump table.

The data field 303 has the actual HRC dump data and it is the region excluding a header of the HRC dump data packet.

When the size of the HRC dump data exceeds the allocated region, the HRC dump data are continuously transmitted in a next packet and the start address is re-established from the initial address of the previously packet to an address of a region obtained by adding the size of the pre-allocated data region to the initial address of the previous packet. Herein, when the size of the dump data is smaller than the size of the allocated region, 'Null' is inserted into the remaining data region.

Meanwhile, a HRC dump table list 310 for processing the HRC dump data includes a table name field 311, a start address field 312 and a size field 313.

The table name field 311 indicates a type of the HRC dump data table, i.e., a name. The start address field 312 indicates a start address of the table, and the size field 313 indicates a complete table size.

The telemetry processing system 200 of the ground control system extracts a packet ID from a telemetry frame based on the HRC dump table list 310. When it turns out that the extracted packet ID is the HRC dump data, the HRC dump data, which are transmitted after being divided into a plurality of data based on the start address included in the header, are composed as one HRC dump table and provided to the operator.

When the HRC dump data are transmitted after divided into a plurality of telemetry frames, the HRC dump table is processed only based on the start address included in the header of the HRC dump data packet.

Since the conventional HRC dump table list 310 has only information on the name, the start address and the entire size of the HRC dump table, it is not easy to identify in which HRC dump table the transmitted telemetry frame is included. When the HRC dump data are transmitted in the form of a plurality of packets, it is difficult to grasp where the packet comes in the order of the packets and it takes a long time to search the HRC dump table list and figure out the sequence of packets.

Accordingly, a method for quickly and exactly processing HRC dump data packets is required.

SUMMARY OF THE INVENTION

It is, therefore, an object of the present invention to provide a method for processing dump data packets in a low earth orbital (LEO) satellite to fast and exactly process high-resolution camera (HRC) dump data based on a table identification (ID) field for classifying a HRC dump table and a counter field indicating an order of packets.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

In accordance with an aspect of the present invention, there is provided a method for processing a dump data packet of a LEO satellite, the method including the steps of: a) extracting table identification (ID) information from a header of high-resolution camera (HRC) dump data transmitted from the LEO satellite; b) searching a HRC dump table from a HRC dump table list based on the extracted table ID information; c)

extracting sequence information from the transmitted HRC dump data; d) completely composing and storing a complete table based on the sequence information searched in the HRC dump table and the extracted sequence information; and e) reading and displaying the HRC dump table upon request of an operator.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and advantages of the present invention will become apparent from the following description of the embodiments with reference to the accompanying drawings. Therefore, those skilled in the art that the present invention is included can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
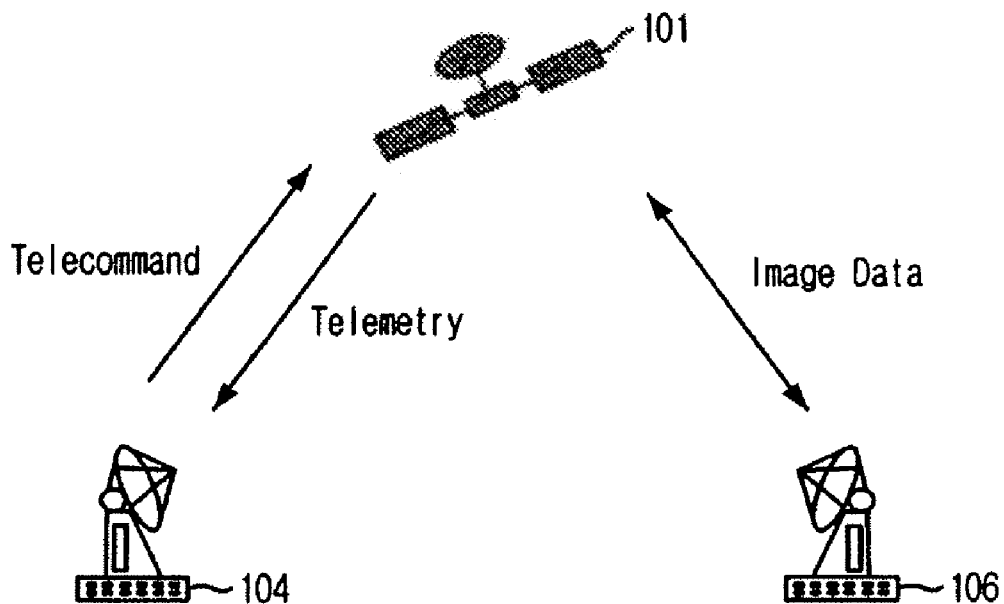
FIG. 1 is a diagram showing a general low earth orbital (LEO) satellite ground control system.
Figure 2:
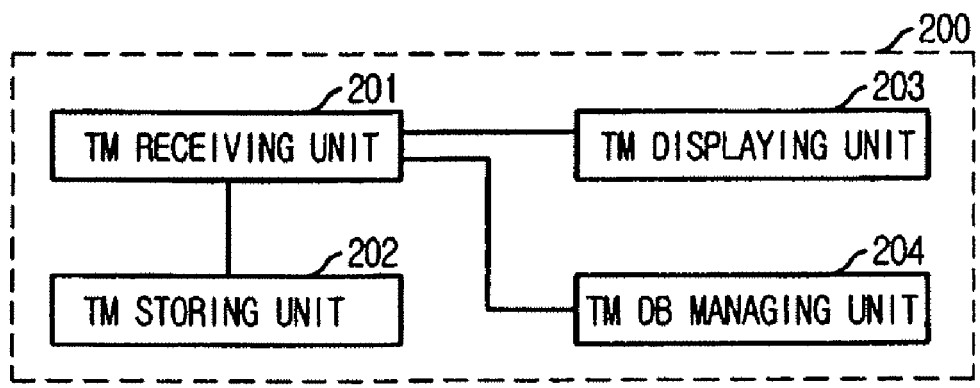
FIG. 2 is a block diagram showing a conventional telemetry processing system.
Figure 3:
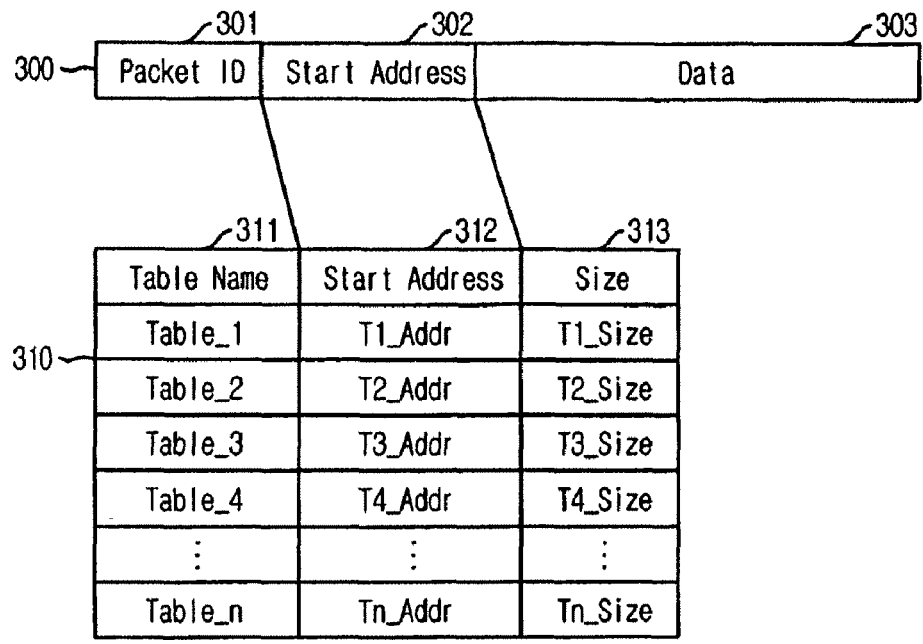
FIG. 3 is a diagram showing a conventional high-resolution camera (HRC) dump data packet and HRC dump table.
Figure 4:
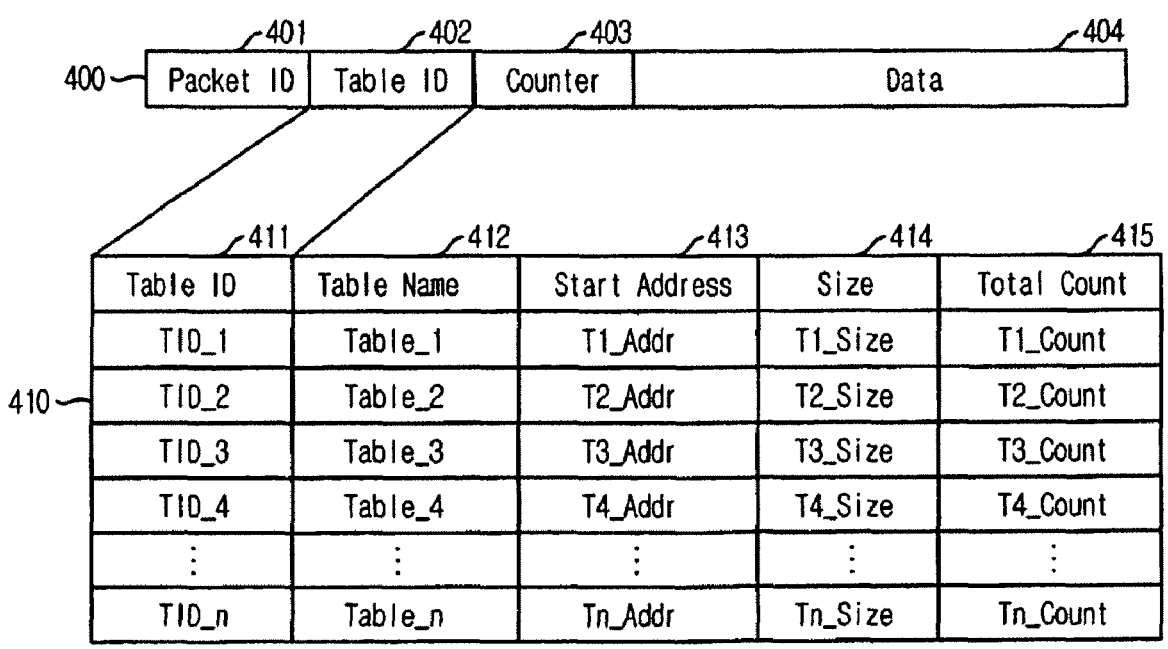
FIG. 4 is a diagram showing a high-resolution camera (HRC) dump data packet and a HRC dump table list in accordance with an embodiment of the present invention.

FIG. 4 is a diagram showing a high-resolution camera (HRC) dump data packet and a HRC dump table list in accordance with an embodiment of the present invention.

A HRC dump data packet 400 used in the present invention includes a packet identification (ID) field 401, a table ID field 402, a counter field 403 and a data field 404.

The packet ID field 401 indicates a type of a telemetry packet and shows whether a telemetry frame is a normal packet having HRC telemetry data or a HRC dump data packet having the HRC dump data.

The table ID field 402 indicates only table ID information which can identify a HRC dump table.

When the HRC dump data are transmitted after being divided into a plurality of packets, the counter field 403 includes a serial number indicating an order of the packets.

The data field 404 has actual HRC dump data and it is a remaining region excluding the header of the HRC dump data packet.

The HRC dump table list 410 used in the present invention includes a table ID field 411, a table name field 412, a start address field 413, a size field 414, and a total count field 415.

The table ID field 411 indicates only the table ID which can identify the HRC dump table. The table name field 412 indicates a name of the HRC dump table. The start address field 413 indicates a table start address. The size field 414 indicates a complete table size. The total count field 415 indicates the number of total packets when the HRC dump data are transmitted after being divided into a plurality of packets.

An entire operation process of the present invention will be described hereinafter referring to FIG. 5.

Figure 5:
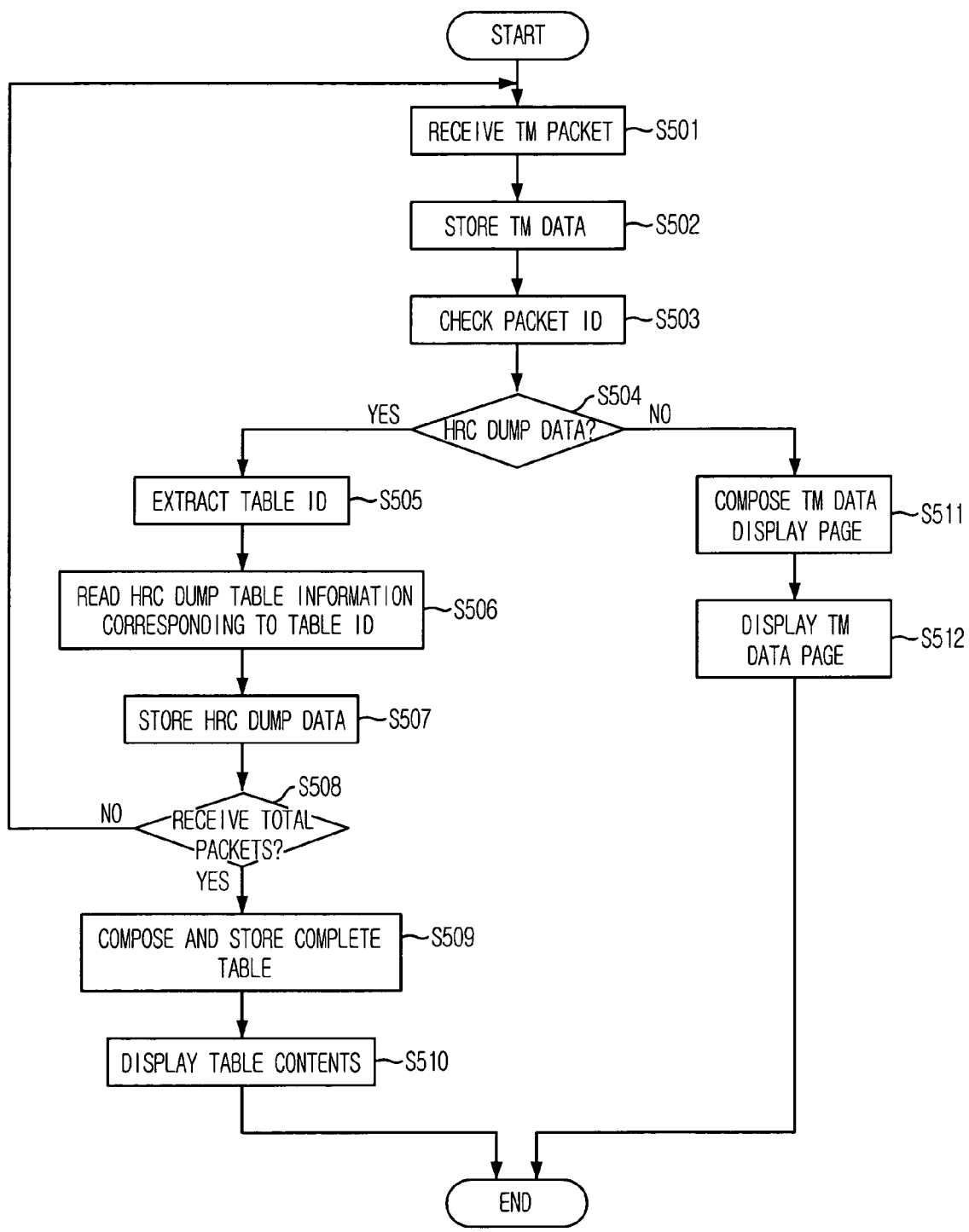
FIG. 5 is a flowchart describing a method for processing a dump data packet of a LEO satellite in accordance with an embodiment of the present invention.

FIG. 5 is a flowchart describing a method for processing a dump data packet of the LEO satellite in accordance with an embodiment of the present invention.

When a ground control system receives a telemetry packet from the LEO satellite at step S501, the ground control system stores the telemetry packet in a storage based on a date at step S502. The ground control system checks a packet ID field of the telemetry packet at step S503 and extracts a table ID field value from the HRC dump data packet at step S505 in case that the packet ID is the HRC dump data at step S504.

The ground control system reads a size of the HRC dump table and total counters from the HRC dump table list based on the extracted table ID at step S506.

The ground control system checks the counter field extracted from the header of the HRC dump data and stores the counter field in a corresponding location at step S507. The ground control system compares the counter field included in the header of the HRC dump data with the total counters of the HRC dump table acquired in the step S506, and checks at step S508 whether all HRC dump data packets corresponding to the table ID are normally transmitted.

When it turns out that all HRC dump data packets corresponding to the table ID are not normally transmitted, the logic flow goes to the step S501 and a reception process of a next packet is performed. When all HRC dump data packets corresponding to the table ID are normally transmitted, the entire table is completely composed and stored at step S509.

When an operator requests the output of the HRC dump table, the ground control system reads and displays the HRC dump table at step S510.

When it turns out in the step S503 that the packet ID is not the HRC dump data, a telemetry display page is composed at step S511 and displayed upon request of the operator at step S512.

As described in the above, the present invention transmits the LEO satellite HRC dump data as an optimized format and quickly and exactly processes the transmitted HRC dump data in the ground control system to provide the HRC dump data the operator.

That is, the HRC dump data includes diverse types of tables. The present invention gives ID for recognizing the HRC dump table to every HRC dump table and inserts the HRC dump table ID into the header of the HRC dump data transmitted from the satellite.

Accordingly, the telemetry processing system of the ground control system can recognize in which table the packet is included based on the table ID included in the header of the HRC dump data.

Also, when the HRC dump data are transmitted after being divided into a plurality of packets, the present invention inserts the serial number of the packet into the counter field of the packet header.

Subsequently, the telemetry processing system of the ground control system checks whether the packets are transmitted in an order and the all packets are normally transmitted by using the field indicating the packet order in the inside of the table, i.e., the counter field included in the header of the HRC dump data. Therefore, the HRC dump table includes total counter fields showing how many packets the HRC dump data are divided into.

As described above, the present invention can instantly recognize in which table the HRC dump data packet is included by using the table ID field and the counter field included in the header of the HRC dump data packet. Also, the present invention can instantly check whether the total packets included in the table are successfully transmitted.

The present invention searches the HRC dump table by using the table ID field and the counter field included in the header of the HRC dump data packet, and can quickly and exactly process HRC (HRC) dump data of the LEO satellite transmitted after being divided into a plurality of packets by grasping the order of the HRC dump table.

The technology of the present invention can be realized as a program and stored in a computer-readable recording medium, such as CD-ROM, RAM, ROM, a floppy disk, a hard disk and a magneto-optical disk. Since the process can be easily implemented by those skilled in the art of the present invention, further description will not be provided herein.

The present application contains subject matter related to Korean patent application No. 2005-0102508, filed with the Korean Intellectual Property Office on Oct. 28, 2005, the entire contents of which are incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A method for processing a dump data packet of a low earth orbital (LEO) satellite, comprising the steps of:
   a) extracting table identification (ID) information from a packet of high-resolution camera (HRC) dump data transmitted from the LEO satellite;
   b) searching a HRC dump table from a HRC dump table list based on the extracted table ID information;
   c) extracting sequence information from the transmitted HRC dump data;
   d) completing and storing a complete table based on the sequence information searched in the HRC dump table and the extracted sequence information; and
   e) reading and displaying the HRC dump table upon request of an operator;
   wherein the packet of the HRC dump data includes a first table ID field indicating table ID which can identify the HRC dump table, wherein the packet of the HRC dump data further includes:
   a packet ID field indicating a type of telemetry packets;
   a counter field indicating sequence of the packet when the HRC dump data are transmitted after being divided into a plurality of packets; and
   a data field having actual HRC dump data.

2. A method for processing a dump data packet of a low earth orbital (LEO) satellite, comprising the steps of:
   a) extracting table identification (ID) information from a header of high-resolution camera (HRC) dump data transmitted from the LEO satellite;
   b) searching a HRC dump table from a HRC dump table list based on the extracted table ID information;
   c) extracting sequence information from the transmitted HRC dump data;
   d) completing and storing a complete table based on the sequence information searched in the HRC dump table and the extracted sequence information; and
   e) reading and displaying the HRC dump table upon request of an operator,
   wherein the HRC dump table list includes:
   a second table ID field indicating table ID which can identify the HRC dump table;
   a table name field indicating a name of the HRC dump table;
   a start address field indicating a table start address;
   a size field indicating a complete table size; and
   a total count field indicating the total number of packets when the HRC dump data are transmitted after being divided into a plurality of packets.

3. The method as recited in the claim 2, wherein in the step d), the complete table is completed and stored by using a size field value, a total count field value of the HRC dump table searched in the HRC dump table list and an extracted counter field value of the HRC dump table searched in the HRC dump data.

* * * * *